US009945265B2

(12) United States Patent
Nakamoto et al.

(10) Patent No.: US 9,945,265 B2
(45) Date of Patent: Apr. 17, 2018

(54) POWER GENERATION SYSTEM AND METHOD FOR OPERATING POWER GENERATION SYSTEM

(71) Applicant: MITSUBISHI HITACHI POWER SYSTEMS, LTD., Kanagawa (JP)

(72) Inventors: Yukimasa Nakamoto, Tokyo (JP); Kazunori Fujita, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 259 days.

(21) Appl. No.: 14/439,114

(22) PCT Filed: Nov. 5, 2013

(86) PCT No.: PCT/JP2013/079944
§ 371 (c)(1),
(2) Date: Apr. 28, 2015

(87) PCT Pub. No.: WO2014/077156
PCT Pub. Date: May 22, 2014

(65) Prior Publication Data
US 2015/0308297 A1 Oct. 29, 2015

(30) Foreign Application Priority Data

Nov. 13, 2012 (JP) .................................. 2012-249733

(51) Int. Cl.
*F01K 23/10* (2006.01)
*F02C 7/224* (2006.01)
(Continued)

(52) U.S. Cl.
CPC ............... *F01K 23/10* (2013.01); *F01K 7/22* (2013.01); *F01K 23/101* (2013.01); *F02C 6/04* (2013.01);
(Continued)

(58) Field of Classification Search
CPC .. F02C 7/224; F02C 6/18; F02C 23/10; F02C 20/16; Y02E 20/16
See application file for complete search history.

(56) References Cited

U.S. PATENT DOCUMENTS 4,622,275 A 11/1986 Noguchi et al.
4,923,768 A 5/1990 Kaneko et al.
(Continued)

FOREIGN PATENT DOCUMENTS

CN 1143993 2/1997
CN 1529040 9/2004
(Continued)

OTHER PUBLICATIONS

PEI Engineering International "CCGT:Breaking the 60 per cent efficiency barrier" 2010.*
(Continued)

*Primary Examiner* — Gerald L Sung
*Assistant Examiner* — William Breazeal
(74) *Attorney, Agent, or Firm* — Wenderoth, Lind & Ponack, L.L.P.

(57) ABSTRACT

A power generation system having a gas turbine, a fuel cell, an exhaust air circulation line, an exhaust fuel gas supply line, a turbine, an exhaust heat recovery boiler, and at least one exhaust air heat exchanger. The turbine is equipped with a high-pressure turbine, a medium-pressure turbine, and a low-pressure turbine. The exhaust heat recovery boiler is equipped with a high-pressure steam circulation mechanism, a medium-pressure steam circulation mechanism, and a low-pressure steam circulation mechanism. The exhaust air heat exchanger exchanges heat between the steam exchanging heat with the exhaust gas in the high-pressure steam circulation mechanism or the medium-pressure steam circulation mechanism and flowing toward the turbine and the
(Continued)

exhaust gas flowing through the exhaust air circulation line, thereby increasing the temperature of the steam and decreasing the temperature of the exhaust gas.

4 Claims, 5 Drawing Sheets

(51) Int. Cl.
*H01M 8/06* (2016.01)
*F01K 7/22* (2006.01)
*F02C 6/18* (2006.01)
*F02C 6/04* (2006.01)
*H01M 8/04* (2016.01)
*H01M 8/124* (2016.01)

(52) U.S. Cl.
CPC ............... *F02C 6/18* (2013.01); *F02C 7/224* (2013.01); *H01M 8/04* (2013.01); *H01M 8/06* (2013.01); *H01M 2008/1293* (2013.01); *H01M 2250/402* (2013.01); *Y02B 90/12* (2013.01); *Y02E 20/16* (2013.01)

(56) References Cited

U.S. PATENT DOCUMENTS

| | | | |
|---|---|---|---|
| 5,417,051 A | 5/1995 | Ankersmit et al. | |
| 6,101,982 A | 8/2000 | Fischer et al. | |
| 2005/0262842 A1* | 12/2005 | Claassen | F01K 23/065 60/618 |
| 2011/0048026 A1* | 3/2011 | Hoffjann | F02C 3/305 60/775 |
| 2011/0088404 A1* | 4/2011 | Gulen | F01K 7/06 60/772 |
| 2011/0266726 A1* | 11/2011 | DePuy | C21B 5/00 266/140 |

FOREIGN PATENT DOCUMENTS

| | | |
|---|---|---|
| JP | 61-39459 | 2/1986 |
| JP | 2-168569 | 6/1990 |
| JP | 6-504873 | 6/1994 |
| JP | 11-297336 | 10/1999 |
| JP | 2001-329806 | 11/2001 |
| JP | 2004-60574 | 2/2004 |
| JP | 2004-134262 | 4/2004 |
| JP | 2006-90287 | 4/2006 |
| JP | 2009-205930 | 9/2009 |
| JP | 2011-141967 | 7/2011 |

OTHER PUBLICATIONS

Lin "Waste heat recovery system for fuel cell systems" 2009.*
Office Action dated Jul. 27, 2016 in corresponding Chinese Application No. 201380058298.5, with English translation.
International Search Report dated Feb. 10, 2014 in International (PCT) Application No. PCT/JP2013/079944.
Notice of Allowance dated Jun. 24, 2016 in corresponding Korean Application No. 10-2015-7012241, with partial English translation.
Notice of Allowance dated Feb. 2, 2016 in Japanese Application No. 2012-249733, with English translation.
Office Action dated Oct. 6, 2015 in Japanese Application No. 2012-249733, with English translation.
Written Opinion of the International Searching Authority dated Feb. 10, 2014 in International (PCT) Application No. PCT/JP2013/079944.
Notification of Grant of Invention Patent dated Feb. 22, 2017 in corresponding Chinese Application No. 201380058298.5, with English translation.
Notification of Completion of Formalities for Registration issued Feb. 22, 2017 in corresponding Chinese Application No. 201380058298.5, with English translation.

* cited by examiner

POWER GENERATION SYSTEM AND METHOD FOR OPERATING POWER GENERATION SYSTEM

TECHNICAL FIELD

The present invention relates to a power generation system combining a solid oxide fuel cell, a gas turbine, and a steam turbine, and to a method for operating the power generation system.

BACKGROUND ART

A solid oxide fuel cell (hereinafter, referred to as SOFC) is known as a highly efficient fuel cell having a wide range of applications. Such an SOFC has a high operating temperature in order to increase ionic conductivity. Thus, air that has been discharged from a compressor of a gas turbine is usable as the air to be supplied to an air electrode (as an oxidant). The SOFC also enables unused high-temperature fuel to be used as fuel for a combustor of the gas turbine.

Thus, for example, as described in Patent Literature 1 listed below, various combinations of an SOFC, a gas turbine, and a steam turbine have been proposed as a power generation system that achieves highly efficient power generation. The combined system described in Patent Literature 1 is provided with an SOFC, a gas turbine combustor that combusts exhaust fuel gas and exhaust air discharged from the SOFC, and a gas turbine having a compressor that compresses air and supplies it to the SOFC.

In addition, Patent Literature 2 describes a technique in which exhaust air discharged from the SOFC exchanges heat with air to be supplied to the SOFC, followed by heat exchange with plumbing of a heat recovery steam generator, so that the heat of the exhaust air is used for power generation of the heat recovery steam generator.

CITATION LIST

Patent Literature

Patent Literature 1: Japanese Unexamined Patent Application Publication No. 2009-205930A
Patent Literature 2: Japanese Unexamined Patent Application Publication No. H11-297336A

SUMMARY OF INVENTION

Technical Problem

The conventional power generation system described above discharges air that has been superheated to a high temperature as the exhaust air from the SOFC. In Patent Literature 1, various heat exchanges are performed with the exhaust air to recover the heat within the exhaust air. Here, improvement of efficiency is desired for the power generation system, which is the impetus for improving the method in which the exhaust air is used.

In order to solve the above-described problem, an object of the present invention is to provide a power generation system and an operating method for a power generation system that make more efficient use of the heat of the exhaust air discharged from the SOFC.

Solution to Problem

A power generation system of the invention to achieve the above-described object includes: a gas turbine having a compressor and a combustor; a fuel cell having an air electrode and a fuel electrode; an exhaust air circulation line supplying exhaust air discharged from the fuel cell to the gas turbine; an exhaust fuel gas supply line supplying exhaust fuel gas discharged from the fuel cell to the gas turbine; a turbine provided with a high-pressure turbine, an intermediate-pressure turbine, and a low-pressure turbine; a heat recovery steam generator provided with a high-pressure steam circulation mechanism recovering heat of exhaust gas discharged from the gas turbine to generate steam and supplying generated steam to the high-pressure turbine, an intermediate-pressure steam circulation mechanism recovering heat of exhaust gas discharged from the gas turbine to generate steam with pressure lower than that of the high-pressure steam circulation mechanism and supplying generated steam to the intermediate-pressure turbine, and a low-pressure steam circulation mechanism recovering heat of exhaust gas discharged from the gas turbine to generate steam with pressure lower than that of the intermediate-pressure steam circulation mechanism and supplying generated steam to the low-pressure turbine; and at least one exhaust air heat exchanger performing heat exchange between exhaust gas flowing through the exhaust air circulation line and steam that has undergone heat exchange with the exhaust gas in one of the high-pressure steam circulation mechanism and the intermediate-pressure steam circulation mechanism and flowing toward the turbine, so as to raise the temperature of the steam and to lower the temperature of the exhaust gas.

Therefore, heat exchange is performed with steam superheated in one of the high-pressure steam circulation mechanism and the intermediate-pressure steam circulation mechanism so as to lower the temperature of exhaust air, thereby enabling the temperature of the exhaust air to be lowered while suppressing the temperature of the exhaust air from being excessively lowered. Thus, it is possible for the exhaust air to be supplied to the gas turbine with the temperature of the exhaust air maintained at a relatively high temperature, and it is possible for the heat of the exhaust air to be recovered in both the gas turbine and the heat recovery steam generator. This can improve usage efficiency. Furthermore, the temperature of the exhaust air is lowered, so that the load on the exhaust air circulation line can be reduced.

In the power generation system of the invention, the high-pressure steam circulation mechanism includes a high-pressure superheater. The exhaust air heat exchanger performs heat exchange between steam superheated by the high-pressure superheater and the exhaust air. Steam flowing through the high-pressure steam circulation mechanism undergoes heat exchange with the exhaust air heat exchanger and is then supplied to the high-pressure turbine.

Therefore, it is possible for the temperature of the exhaust air to be lowered while suppressing the temperature of the exhaust air from being excessively lowered.

The power generation system of the invention includes a fuel gas supply line supplying fuel gas to the gas turbine; and at least one fuel gas heat exchanger performing heat exchange between the fuel gas flowing through the fuel gas supply line and the steam that has undergone heat exchange with the exhaust gas in the high-pressure steam circulation mechanism and flowing toward the turbine, so as to lower the temperature of the steam and to raise the temperature of the fuel gas. The steam flowing through the high-pressure steam circulation mechanism undergoes heat exchange with the fuel gas heat exchanger, heat exchange with the exhaust air heat exchanger, and is then supplied to the high-pressure turbine.

Therefore, it is possible for the temperature of the exhaust air to be lowered while suppressing the temperature of the exhaust air from being excessively lowered. Furthermore, the temperature of the fuel gas is raised, so that the heat thereof can be recovered in both the gas turbine and the turbine.

In the power generation system of the invention, the heat recovery steam generator further includes a reheat steam circulation mechanism provided with a reheater raising the temperature of recovered steam with exhaust gas discharged from the gas turbine. The reheat steam circulation mechanism recovers steam passing through the high-pressure turbine, raises the temperature of the recovered steam in the reheater, and supplies the steam with the temperature thereof raised to the intermediate-pressure turbine. The exhaust air heat exchanger performs heat exchange between steam superheated by the reheater and the exhaust air, and steam flowing through the reheat steam circulation mechanism undergoes heat exchange with the exhaust air heat exchanger, and is then supplied to the intermediate-pressure turbine.

Therefore, it is possible for the temperature of the exhaust air to be lowered while suppressing the temperature of the exhaust air from being excessively lowered.

A method for operating a power generation system including a gas turbine having a compressor and a combustor, a fuel cell having an air electrode and a fuel electrode, an exhaust air circulation line supplying exhaust air discharged from the fuel cell to the gas turbine, an exhaust fuel gas supply line supplying exhaust fuel gas discharged from the fuel cell to the gas turbine, a turbine provided with a high-pressure turbine, an intermediate-pressure turbine, and a low-pressure turbine, and a heat recovery steam generator provided with a high-pressure steam circulation mechanism recovering heat of exhaust gas discharged from the gas turbine to generate steam and supplying generated steam to the high-pressure turbine, an intermediate-pressure steam circulation mechanism recovering heat of exhaust gas discharged from the gas turbine to generate steam with pressure lower than that of the high-pressure steam circulation mechanism and supplying generated steam to the intermediate-pressure turbine, and a low-pressure steam circulation mechanism recovering heat of exhaust gas discharged from the gas turbine to generate steam with pressure lower than the intermediate-pressure steam circulation mechanism and supplying generated steam to the low-pressure turbine. The method involves performing heat exchange between the exhaust gas and steam flowing through one of the high-pressure steam circulation mechanism and the intermediate-pressure steam circulation mechanism, and after performing the heat exchange, performing heat exchange between steam flowing toward the turbine and exhaust gas flowing through the exhaust air circulation line, so as to raise the temperature of the steam and to lower the temperature of the exhaust gas.

Therefore, heat exchange is performed with steam superheated in one of the high-pressure steam circulation mechanism and the intermediate-pressure steam circulation mechanism so as to lower the temperature of exhaust air, thereby enabling the temperature of the exhaust air to be lowered while suppressing the temperature of the exhaust air from being excessively lowered. Thus, it is possible for the exhaust air to be supplied to the gas turbine with the temperature of the exhaust air maintained at a relatively high temperature, and it is possible for the heat of the exhaust air to be recovered in both the gas turbine and the heat recovery steam generator. This can improve usage efficiency. Further-more, the temperature of the exhaust air is lowered, so that the load on the exhaust air circulation line can be reduced.

Advantageous Effects of Invention

According to the power generation system and the method for operating the power generation system of the invention, heat exchange is performed with steam superheated in one of the high-pressure steam circulation mechanism and the intermediate-pressure steam circulation mechanism so as to lower the temperature of exhaust air, thereby enabling the temperature of the exhaust air to be lowered while suppressing the temperature of the exhaust air from being excessively lowered. Thus, it is possible for the exhaust air to be supplied to the gas turbine with the temperature of the exhaust air maintained at a relatively high temperature, and it is possible for the heat of the exhaust air to be recovered in both the gas turbine and the heat recovery steam generator. This can improve usage efficiency.

DESCRIPTION OF EMBODIMENTS

A preferred embodiment of a power generation system and a method for operating the power generation system pertaining to the invention are described in detail below, with reference to the accompanying drawings. Note that the invention is not limited by the embodiment, and when a plurality of embodiments are present, the invention is intended to include a configuration combining these embodiments.

Embodiment

The power generation system of the embodiment is a Triple Combined Cycle (Triple Combined Cycle: registered trademark) combining a solid oxide fuel cell (hereinafter, referred to as SOFC), a gas turbine, and a steam turbine. This Triple Combined Cycle is able to extract electricity in the three stages of the SOFC, the gas turbine, and the steam turbine by disposing the SOFC on the upstream side of a gas turbine combined cycle (GTCC) power generation, and is thus able to realize extremely high power generation efficiency. Note that in following description, a solid oxide fuel cell is employed as the fuel cell of the invention; however, fuel cells are not limited to this type.

Figure 1:
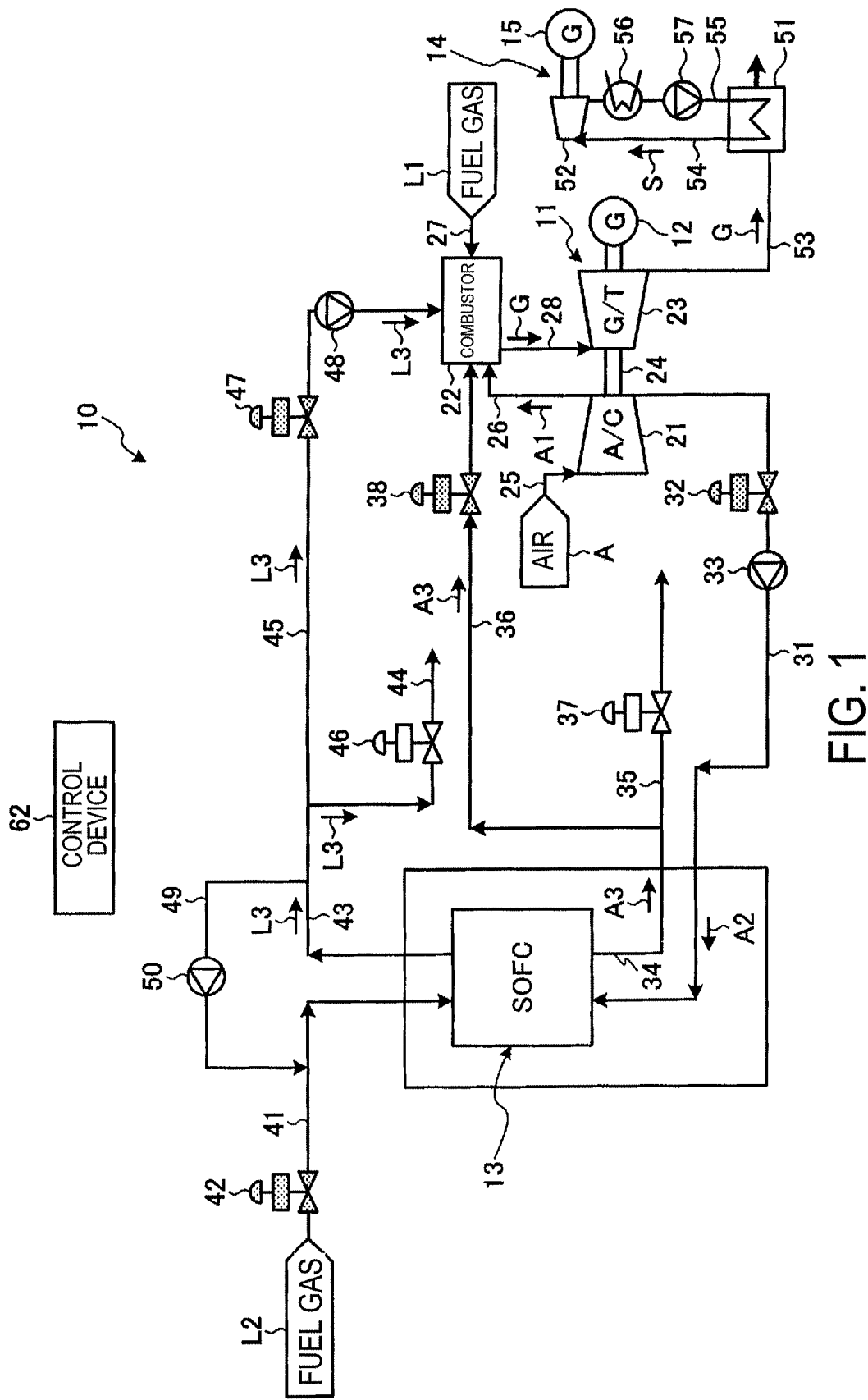
FIG. 1 is a schematic configuration diagram illustrating a power generation system of the embodiment.

FIG. 1 is a schematic configuration diagram illustrating the power generation system pertaining to the embodiment. In the embodiment, as illustrated in FIG. 1, a power generation system 10 includes a gas turbine 11 and a power generator 12, an SOFC 13, and a steam turbine 14 and power generator 15. The power generation system 10 is configured to combine power generation by the gas turbine 11, power generation by the SOFC 13, and power generation by the steam turbine 14 to achieve high power generation efficiency. The power generation system 10 is also provided with a control device 62. The control device 62 controls the operation of each component of the power generation system 10 in accordance with input settings, input instructions, results detected in a detection unit, and the like.

The gas turbine 11 includes a compressor 21, a combustor 22, and a turbine 23. The compressor 21 and the turbine 23 are coupled in an integrally rotatable manner by a rotating shaft 24. The compressor 21 compresses air A taken in through an air intake line 25. The combustor 22 mixes and combusts compressed air A1 supplied from the compressor 21 through a first compressed air supply line 26 and fuel gas L1 supplied from a first fuel gas supply line 27. The turbine 23 is rotated by exhaust gas (combustion gas) G supplied from the combustor 22 through an exhaust gas supply line 28. Although not illustrated in the drawings, the turbine 23 is supplied with the compressed air A1 compressed by the compressor 21 through a casing, and the compressed air A1 as cooling air cools blades and the like. The power generator 12 is provided coaxially with the turbine 23 and is capable of generating power through the rotation of the turbine 23. Note that the fuel gas L1 supplied to the combustor 22 is, for example, liquefied natural gas (LNG).

The SOFC 13 is supplied with high-temperature fuel gas as a reductant and with high-temperature air (oxidizing gas) as an oxidant, so as to react at a predetermined operating temperature to generate power. This SOFC 13 is constituted of an air electrode, a solid electrolyte, and a fuel electrode that are housed in a pressure container. A portion of compressed air A2 compressed by the compressor 21 is supplied to the air electrode and fuel gas is supplied to the fuel electrode, so that power is generated. Note that, as fuel gas L2 supplied to the SOFC 13, for example, liquefied natural gas (LNG), hydrogen ($H_2$) and carbon monoxide (CO), hydrocarbon gas such as methane ($CH_4$), or gas produced in a gasification facility for carbonaceous materials such as coal is used. Also, the oxidizing gas supplied to the SOFC 13 is a gas containing approximately 15% to 30% oxygen. Typically, air is suitable. However, in addition to air, mixed gas of combustion exhaust gas and air, mixed gas of oxygen and air, or the like may be used (hereinafter, the oxidizing gas supplied to the SOFC 13 will be referred to as "air").

This SOFC 13 is connected with a second compressed air supply line 31 that branches off from the first compressed air supply line 26 and is capable of supplying a portion of the compressed air A2 compressed by the compressor 21 to an inlet of the air electrode. This second compressed air supply line 31 is provided with a control valve 32 that is capable of adjusting the volume of air to be supplied, and a blower (booster) 33 that is capable of boosting the pressure of the compressed air A2, along the air-flow direction. The control valve 32 is provided on the upstream side in the air-flow direction of the second compressed air supply line 31. The blower 33 is provided on the downstream side of the control valve 32. The SOFC 13 is connected with an exhaust air line 34 expelling exhaust air A3 used by the air electrode. This exhaust air line 34 branches into an exhaust line 35 that discharges the exhaust air A3 used by the air electrode to the outside, and a compressed air circulation line 36 that is connected to the combustor 22. The exhaust line 35 is provided with a control valve 37 that is capable of adjusting the volume of air to be discharged. The compressed air circulation line 36 is provided with a control valve 38 that is capable of adjusting the volume of air to be circulated.

The SOFC 13 is also provided with a second fuel gas supply line 41 that supplies the fuel gas L2 to the inlet of the fuel electrode. The second fuel gas supply line 41 is provided with a control valve 42 that is capable of adjusting the volume of fuel gas to be supplied. The SOFC 13 is connected with an exhaust fuel line 43 expelling an exhaust fuel gas L3 used by the fuel electrode. This exhaust fuel line 43 branches into an exhaust line 44 that discharges to the outside, and an exhaust fuel gas supply line 45 that is connected to the combustor 22. The exhaust line 44 is provided with a control valve 46 that is capable of adjusting the volume of fuel gas to be discharged. The exhaust fuel gas supply line 45 is provided with a control valve 47 that is capable of adjusting the volume of fuel gas to be supplied, and with a blower 48 that is capable of boosting the pressure of fuel, along the flow direction of the exhaust fuel gas L3. The control valve 47 is provided on the upstream side in the flow direction of the exhaust fuel gas L3 in the exhaust fuel gas supply line 45, and the blower 48 is provided on the downstream side of the control valve 47.

The SOFC 13 is also provided with a fuel gas recirculation line 49 that connects the exhaust fuel line 43 and the second fuel gas supply line 41. The fuel gas recirculation line 49 is provided with a recirculation blower 50 that recirculates the exhaust fuel gas L3 from the exhaust fuel line 43 into the second fuel gas supply line 41.

The steam turbine 14 rotates a turbine 52 with steam generated by a heat recovery steam generator (HRSG) 51. This heat recovery steam generator 51 is connected with an exhaust gas line 53 extending from the gas turbine 11 (turbine 23), and produces steam S through heat exchange between air and high-temperature exhaust gas G. A steam supply line 54 and a water supply line 55 are provided between the steam turbine 14 (turbine 52) and the heat recovery steam generator 51. Also, the water supply line 55 is provided with a condenser 56 and a water supply pump 57. The power generator 15 is provided coaxially with the turbine 52 and is capable of generating power through the rotation of the turbine 52. Note that the exhaust gas G recovered in the heat recovery steam generator 51 is released into the atmosphere after removal of any toxic materials.

The operation of the power generation system 10 pertaining to the embodiment will now be described. When the power generation system 10 is started, the gas turbine 11, the steam turbine 14, and the SOFC 13 are started in the stated order.

First, in the gas turbine 11, the compressor 21 compresses the air A, the combustor 22 mixes the compressed air A1 with the fuel gas L1 and combusts the mixture, and the turbine 23 rotates by the exhaust gas G. Thus, the power generator 12 begins to generate power. Next, in the steam turbine 14, the turbine 52 rotates by the steam S generated by the heat recovery steam generator 51. Thus, the power generator 15 begins to generate power.

Subsequently, in the SOFC 13, the compressed air A2 is first supplied to boost the pressure, and heating begins. With the control valve 37 of the exhaust line 35 and the control valve 38 of the compressed air circulation line 36 closed and with the blower 33 of the second compressed air supply line 31 stopped, the control valve 32 is opened to a predetermined lift. Then, a portion of the compressed air A2 compressed by the compressor 21 is supplied from the second compressed air supply line 31 toward the SOFC 13. Accordingly, the pressure is raised on the SOFC 13 side as the compressed air A2 is supplied thereto.

Meanwhile, in the SOFC 13, the fuel gas L2 is supplied to the fuel electrode side to boost the pressure. With the control valve 46 of the exhaust line 44 and the control valve 47 of the exhaust fuel gas supply line 45 closed and with the blower 48 stopped, the control valve 42 of the second fuel gas supply line 41 is opened and the recirculation blower 50 of the fuel gas recirculation line 49 is driven. Then, the fuel gas L2 is supplied from the second fuel gas supply line 41 toward the SOFC 13, and the exhaust fuel gas L3 is recirculated by the fuel gas recirculation line 49. Accordingly, the pressure is raised on the SOFC 13 side as the fuel gas L2 is supplied thereto.

Next, once the pressure on the air electrode side of the SOFC 13 reaches an outlet pressure of the compressor 21, the control valve 32 is fully opened, and the blower 33 is driven. The control valve 37 is simultaneously opened and the exhaust air A3 from the SOFC 13 is discharged from the exhaust line 35. Then, the compressed air A2 is supplied to the SOFC 13 side by the blower 33. The control valve 46 is simultaneously opened, and the exhaust fuel gas L3 from the SOFC 13 is discharged from the exhaust line 44. Next, once the pressure on the air electrode side and the pressure on the fuel electrode side of the SOFC 13 reach target pressures, the boost in the pressure of the SOFC 13 is complete.

Afterward, once the reaction (power generation) of the SOFC 13 stabilizes and the components of the exhaust air A3 and the exhaust fuel gas L3 stabilize, the control valve 37 is closed and the control valve 38 is opened. Then, the exhaust air A3 from the SOFC 13 is supplied to the combustor 22 through the compressed air circulation line 36. The control valve 46 is closed, while the control valve 47 is opened and the blower 48 is driven. Then, the exhaust fuel gas L3 from the SOFC 13 is supplied to the combustor 22 through the exhaust fuel gas supply line 45. At this time, the fuel gas L1 supplied to the combustor 22 through the first fuel gas supply line 27 is reduced.

Here, the power generation by the power generator 12 through the driving of the gas turbine 11, the power generation by the SOFC 13, and the power generation by the power generator 15 through the driving of the steam turbine 14 are all active, so that the power generation system 10 is in a steady operation state.

Figure 2:
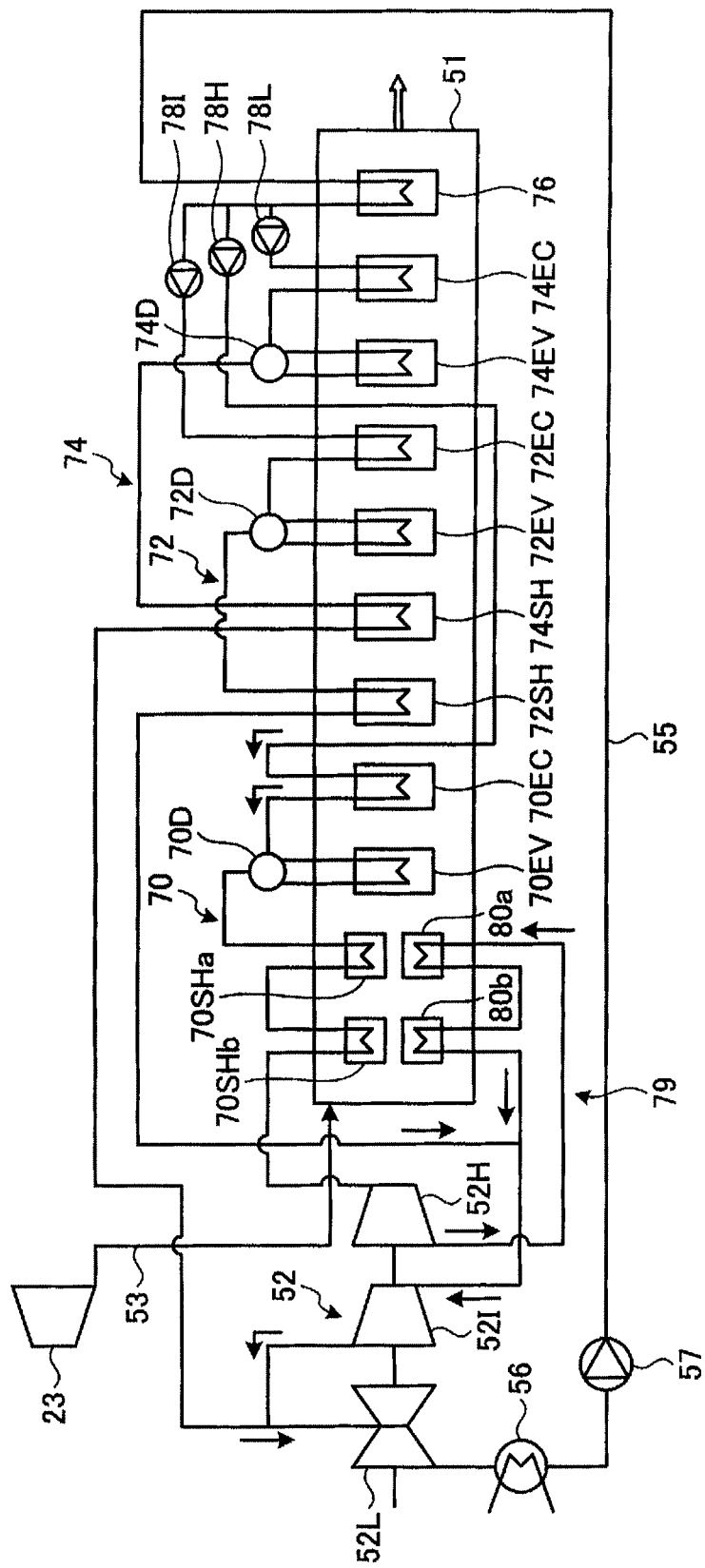
FIG. 2 is a schematic configuration diagram illustrating a heat recovery steam generator and turbine of the power generation system pertaining to an embodiment of the invention.

The configuration of the steam turbine of the embodiment, specifically the configurations of the heat recovery steam generator 51 and the turbine 52, will now be described, with reference to FIG. 2. FIG. 2 is a schematic configuration diagram illustrating the heat recovery steam generator and the turbine in the power generation system pertaining to an embodiment of the invention. The turbine 52 includes a high-pressure turbine 52H, an intermediate-pressure turbine 52I, and a low-pressure turbine 52L. The high-pressure turbine 52H is driven by high-pressure steam supplied from the heat recovery steam generator 51. The intermediate-pressure turbine 52I is driven by steam supplied from the heat recovery steam generator 51 that is lower in pressure than the steam supplied to the high-pressure turbine 52H. The low-pressure turbine 52L is driven by steam supplied from the heat recovery steam generator 51 that is lower in pressure than the steam supplied to the intermediate-pressure turbine 52I.

The heat recovery steam generator 51 includes a high-pressure steam circulation mechanism 70 recovering heat of exhaust gas discharged from the turbine 23 of the gas turbine 11 to generate steam and supplying generated steam to the high-pressure turbine 52H; an intermediate-pressure steam circulation mechanism 72 recovering heat of exhaust gas discharged from the gas turbine 11 to generate steam with pressure lower than that of the high-pressure steam circulation mechanism 70 and supplying generated steam to the intermediate-pressure turbine 52I; a low-pressure steam circulation mechanism 74 recovering heat of exhaust gas discharged from the gas turbine 11 to generate steam with pressure lower than that of the intermediate-pressure steam circulation mechanism 72 and supplying generated steam to the low-pressure turbine 52L, and a reheat steam circulation mechanism 79 raising again the temperature of the steam discharged from the high-pressure turbine 52H with the exhaust gas and supplying the steam with the temperature thereof raised to the intermediate-pressure turbine 52I.

The heat recovery steam generator 51 also includes a pre-heater 76, a high-pressure pump 78H, an intermediate-pressure pump 78I, and a low-pressure pump 78L. The pre-heater 76 pre-heats water supplied from the condenser 56 through the water supply line 55. The high-pressure pump 78H supplies water pre-heated by the pre-heater 76 to the high-pressure steam circulation mechanism 70. The intermediate-pressure pump 78I supplies water pre-heated by the pre-heater 76 to the intermediate-pressure steam circulation mechanism 72. The low-pressure pump 78L supplies the water pre-heated by the pre-heater 76 to the low-pressure steam circulation mechanism 74.

The high-pressure steam circulation mechanism 70 is a mechanism for raising the temperature of the water supplied from the pre-heater 76 with the exhaust gas so as to generate steam and then supplying the steam to the high-pressure turbine 52H. The high-pressure steam circulation mechanism 70 includes a high-pressure drum 70D, a high-pressure economizer 70EC, a high-pressure steam evaporator 70EV, a high-pressure superheater 70SHa, and a high-pressure superheater 70SHb. The high-pressure economizer 70EC, the high-pressure steam evaporator 70EV, the high-pressure superheater 70SHa, and the high-pressure superheater 70SHb are heat exchangers provided with heat transfer pipes and disposed within a pipeline through which the exhaust gas G flows. Heat exchange is performed between the exhaust gas and water or steam flowing within the heat transfer pipes, so that the temperature of the water or steam is raised. Each of the later-described intermediate-pressure steam circulation mechanism 72 and low-pressure steam circulation mechanism 74 also includes an economizer, a steam evaporator, and two superheaters, so being heat exchangers in a similar manner. The components of the high-pressure steam circulation mechanism 70 are each connected by lines (pipes), from the pre-heater 76 to the high-pressure turbine 52H, in the order of the high-pressure economizer 70EC, the high-pressure drum 70D, the high-pressure superheater 70SHa, and the high-pressure superheater 70SHb. Further, the high-pressure steam circulation mechanism 70 is disposed having the above-stated order from the downstream side to the upstream side in the flow direction of the exhaust gas of the heat recovery steam generator 51. In the high-pressure steam circulation mechanism 70, water pre-heated by the pre-heater 76 is sent to the high-pressure economizer 70EC by the high-pressure pump 78H, superheated by the high-pressure economizer 70EC, and then supplied to the high-pressure drum 70D. The high-pressure steam evaporator 70EV is connected with the high-pressure drum 70D. The high-pressure steam evaporator 70EV has both ends connected to the high-pressure drum 70D so as to circulate water accumulated in the high-pressure drum 70D while raising the temperature of the water with the exhaust gas, thereby generating steam. The steam generated by the high-pressure steam evaporator 70EV is supplied from the high-pressure drum 70D to the high-pressure superheater 70SHa, so as to be further superheated. The steam superheated by the high-pressure superheater 70SHa is supplied to the high-pressure superheater 70SHb so as to be further superheated, and then supplied to the high-pressure turbine 52H. The high-pressure turbine 52H is driven by the steam supplied from the high-pressure steam circulation mechanism 70.

The intermediate-pressure steam circulation mechanism 72 is a mechanism for raising the temperature of the water supplied from the pre-heater 76 with the exhaust gas so as to generate steam and then supplying the steam to the intermediate-pressure turbine 52I. The intermediate-pressure steam circulation mechanism 72 includes an intermediate-pressure drum 72D, an intermediate-pressure economizer 72EC, an intermediate-pressure steam evaporator 72EV, and an intermediate-pressure superheater 72SH. The components of the intermediate-pressure steam circulation mechanism 72 are each connected by lines (pipes), from the pre-heater 76 to the intermediate-pressure turbine 52I, in the order of the intermediate-pressure economizer 72EC, the intermediate-pressure drum 72D, and the intermediate-pressure superheater 72SH. Further, the intermediate-pressure steam circulation mechanism 72 is disposed having the above-stated order from the downstream side to the upstream side in the flow direction of the exhaust gas of the heat recovery steam generator 51. In the intermediate-pressure steam circulation mechanism 72, water pre-heated by the pre-heater 76 is sent to the intermediate-pressure economizer 72EC by the intermediate-pressure pump 78I, superheated by the intermediate-pressure economizer 72EC, and then supplied to the intermediate-pressure drum 72D. The intermediate-pressure steam evaporator 72EV is connected with the intermediate-pressure drum 72D. The intermediate-pressure steam evaporator 72EV has both ends connected to the intermediate-pressure drum 72D so as to circulate water accumulated in the intermediate-pressure drum 72D while raising the temperature of the water with the exhaust gas, thereby generating steam. The steam generated by the intermediate-pressure steam evaporator 72EV is supplied from the intermediate-pressure drum 72D to the intermediate-pressure superheater 72SH so as to be further superheated. The steam superheated by the intermediate-pressure superheater 72SH is supplied to the intermediate-pressure turbine 52I. The intermediate-pressure turbine 52I is driven by the steam supplied from the intermediate-pressure steam circulation mechanism 72. The components of the intermediate-pressure steam circulation mechanism 72 are disposed further on the downstream side in the flow direction of the exhaust gas, relative to the corresponding components of the high-pressure steam circulation mechanism 70. Accordingly, the temperature and pressure of the steam are lower than those of the high-pressure steam circulation mechanism 70.

The low-pressure steam circulation mechanism 74 is a mechanism for raising the temperature of the water supplied from the pre-heater 76 with the exhaust gas so as to generate steam and then supplying the steam to the low-pressure turbine 52L. The low-pressure steam circulation mechanism 74 includes a low-pressure drum 74D, a low-pressure economizer 74EC, a low-pressure steam evaporator 74EV, and a low-pressure superheater 74SH. The components of the low-pressure steam circulation mechanism 74 are each connected by lines (pipes), from the pre-heater 76 to the low-pressure turbine 52L, in the order of the low-pressure economizer 74EC, the low-pressure drum 74D, and the low-pressure superheater 74SH. Further, the low-pressure steam circulation mechanism 74 is disposed having the above-stated order from the downstream side to the upstream side in the flow direction of the exhaust gas of the heat recovery steam generator 51. In the low-pressure steam circulation mechanism 74, the water pre-heated by the pre-heater 76 is sent to the low-pressure economizer 74EC by the low-pressure pump 78L, superheated by the low-pressure economizer 74EC, and then supplied to the low-pressure drum 74D. The low-pressure steam evaporator 74EV is connected with the low-pressure drum 74D. The low-pressure steam evaporator 74EV has both ends connected to the low-pressure drum 74D so as to circulate water accumulated in the low-pressure drum 74D while raising the temperature of the water with the exhaust gas, thereby generating steam. The steam generated by the low-pressure steam evaporator 74EV is supplied from the low-pressure drum 74D to the low-pressure superheater 74SH so as to be further superheated. The steam superheated by the low-pressure superheater 74SH is supplied to the low-pressure turbine 52L. The low-pressure turbine 52L is driven by the steam supplied from the low-pressure steam circulation mechanism 74. The components of the low-pressure steam circulation mechanism 74 are disposed further on the downstream side in the flow direction of the exhaust gas, relative to the corresponding components of the intermediate-pressure steam circulation mechanism 72. Accordingly, the temperature and pressure of the steam are lower than those of the intermediate-pressure steam circulation mechanism 72.

The reheat steam circulation mechanism 79 is a mechanism for heating again the steam that has passed through the high-pressure turbine 52H with the exhaust gas and supplying the steam to the intermediate-pressure turbine 52I. The reheat steam circulation mechanism 79 includes reheaters 80a, 80b. The reheaters 80a, 80b are heat exchangers provided with heat transfer pipes and disposed within a pipeline through which the exhaust gas G flows. Heat exchange is performed between the exhaust gas and steam flowing within the heat transfer pipes, so that the temperature of the steam is raised. The reheaters 80a, 80b are disposed in an area on the upstream side within the heat recovery steam generator 51, which is close to the high-pressure superheaters 70SHa, SHb. Further, the reheater 80a is disposed on the downstream side of the reheater 80b in the flow direction of the exhaust gas. The reheat steam circulation mechanism 79 superheats the steam that has passed through the high-pressure turbine 52H with the reheater 80a, then further superheats the steam with the reheater 80b, and then supplies the steam to the intermediate-pressure turbine 52I. The heat recovery steam generator 51 is configured as described above.

Figure 3:
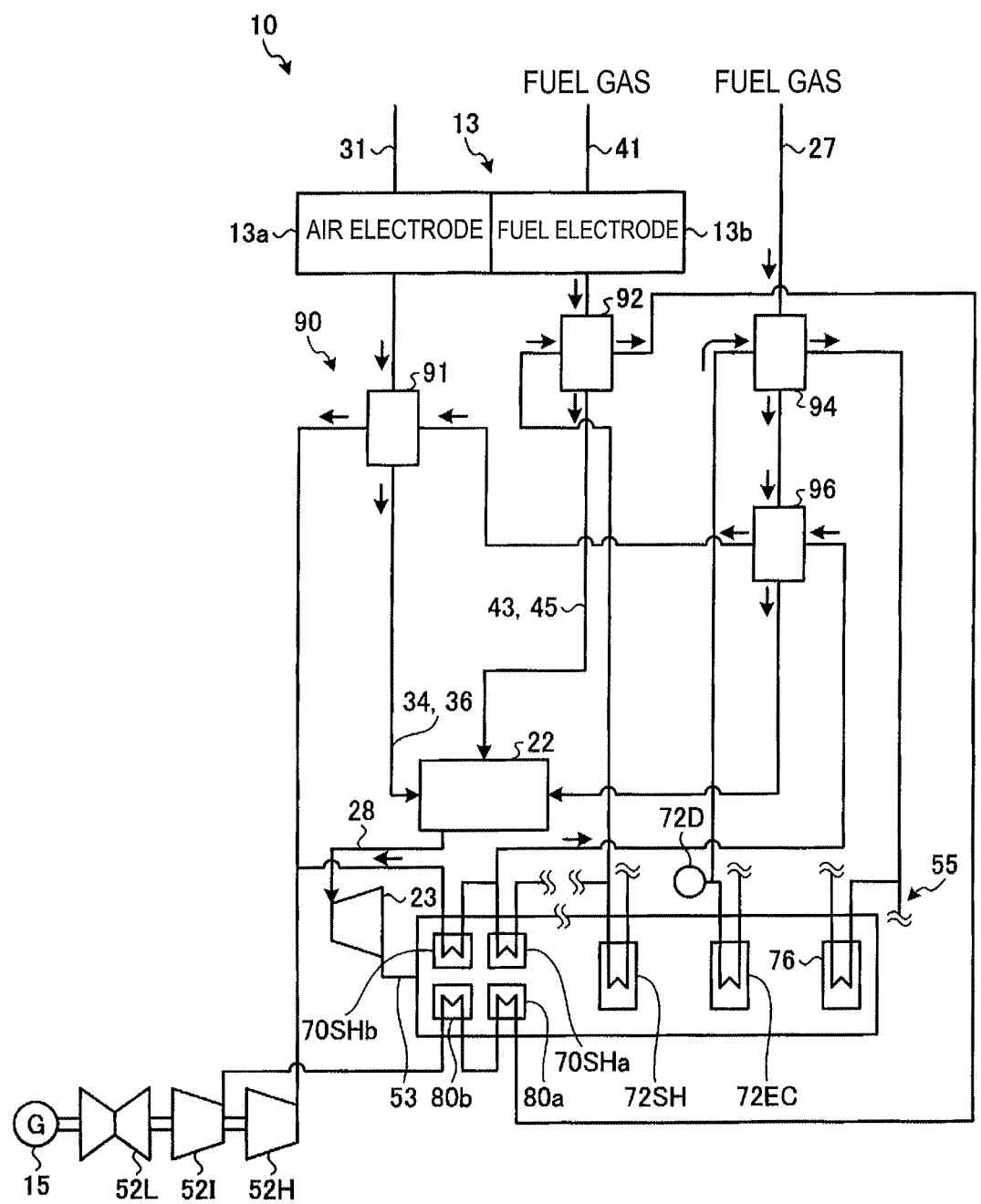
FIG. 3 is a schematic configuration diagram illustrating a heat exchange unit of the power generation system of the embodiment.

FIG. 3 is a schematic configuration diagram illustrating a heat exchange unit of the power generation system of the embodiment. In the meantime, in a typical power generation system, high-temperature exhaust air is discharged from an air electrode 13a of the SOFC 13. Thus, the compressed air supply line through which the exhaust air flows is exposed to high temperatures. As such, supposing that the exhaust air is supplied as-is to the combustor 22, the compressed air supply line needs to be manufactured from a heat-resistant material. This raises costs for power generation plants (and power generation systems).

Therefore, as illustrated in FIG. 3, the power generation system 10 of the embodiment is provided with a heat exchange unit 90 performing heat exchange between the exhaust air directed from the air electrode 13a of the SOFC 13 toward the gas turbine 11 and the exhaust fuel gas directed from the fuel electrode 13b of the SOFC 13 toward the gas turbine 11, and the steam flowing through the heat recovery steam generator 51 and the turbine 52. The heat exchange unit 90 includes an exhaust air heat exchanger 91, an exhaust fuel heat exchanger 92, a fuel heat exchanger 94, and a fuel heat exchanger 96.

The exhaust air heat exchanger 91 is provided in one of the exhaust air line 34 and the compressed air circulation line 36, that is, in an exhaust air circulation line circulating the exhaust air discharged from the SOFC 13. The exhaust air heat exchanger 91 performs heat exchange between the exhaust air flowing through the exhaust air circulation line and the steam superheated by the heat recovery steam generator 51 and directed toward the turbine 52, so as to lower the temperature of the exhaust air and to raise the temperature of the steam. The exhaust air heat exchanger 91 has flow into it steam which has been superheated by the high-pressure superheater 70SHa and had its temperature lowered by the fuel heat exchanger 96, and supplies this steam that has undergone heat exchange to the high-pressure turbine 52H. Note that in the embodiment, the steam which has been superheated by the high-pressure superheater 70SHa and had its temperature lowered by the fuel heat exchanger 96 flows into the exhaust air heat exchanger 91. However, the steam which has been superheated by the high-pressure superheater 70SHb and had its temperature lowered by the fuel heat exchanger 96 may be used instead.

The exhaust fuel heat exchanger 92 is provided in one of the exhaust fuel line 43 and the exhaust fuel gas supply line 45, that is, in an exhaust fuel gas circulation line circulating the exhaust fuel gas discharged from the SOFC 13. The exhaust fuel heat exchanger 92 performs heat exchange between the exhaust fuel gas flowing through the exhaust fuel gas circulation line and the steam superheated by the heat recovery steam generator 51 and directed toward the turbine 52, so as to lower the temperature of the exhaust fuel gas and to raise the temperature of the steam. The exhaust fuel exchanger 92 has flow into it steam which has been superheated by the intermediate-pressure superheater 72SH, and supplies this steam that has undergone heat exchange to the reheater 80a. The steam supplied to the reheater 80a is further superheated by the superheater 80b and then supplied to the intermediate-pressure turbine 52I.

The fuel heat exchanger 94 is provided in the first fuel gas supply line 27. The fuel heat exchanger 94 performs heat exchange between the fuel gas flowing through the first fuel gas supply line 27, that is the fuel gas supplied to the combustor 22, and the water that has had its temperature raised by the heat recovery steam generator 51. The fuel heat exchanger 94 raises the temperature of the fuel gas and lowers the temperature of the steam. The fuel heat exchanger 94 has flow into it water which has been superheated by the intermediate-pressure economizer 72EC, and supplies this water which has undergone heat exchange to the water supply line 55.

The fuel heat exchanger 96 is provided further on the downstream side of the first fuel gas supply line 27 in the flow direction of the fuel gas, relative to the fuel heat exchanger 94, that is, the fuel heat exchanger 96 is provided closer to the combustor 22. The fuel heat exchanger 96 performs heat exchange between the fuel gas flowing through the first fuel gas supply line 27, that is the fuel gas supplied to the combustor 22, and the steam superheated by the heat recovery steam generator 51. The fuel heat exchanger 96 raises the temperature of the fuel gas and lowers the temperature of the steam. The fuel heat exchanger 96 further raises the temperature of the fuel that has been raised by the fuel heat exchanger 94. The fuel heat exchanger 96 has flow into it steam which has been superheated by the high-pressure superheater 70SHa, and supplies, to the exhaust air heat exchanger 91, this steam with a temperature lowered through heat exchange. The heat exchange unit 90 is configured as described above.

The power generation system 10 is provided with the exhaust air heat exchanger 91 and performs heat exchange between the steam superheated in the high-pressure steam circulation mechanism 70 and the exhaust air so as to lower the temperature of the exhaust air. This enables the load on the exhaust air circulation line circulating the exhaust air to be reduced. Further, having steam superheated in the high-pressure steam circulation mechanism 70 undergo heat exchange with the exhaust air enables the temperature of the exhaust air to be maintained at or above a high fixed, temperature. Here, the exhaust air is supplied to the combustor 22, mixed with the exhaust fuel gas and the fuel gas, and heated by the combustor, then passes through the turbine 23 and further passes through the heat recovery steam generator 51. Therefore, the exhaust air is usable to extract energy for power generation in two places including the gas turbine 11 and the steam turbine 14. Therefore, maintaining the temperature of the exhaust air higher enables more efficient energy extraction. Accordingly, the power generation system 10 performs heat exchange between the exhaust air and the steam so as to enable the load on the exhaust air circulation line circulating the exhaust air to be reduced, and, in addition, makes the steam to be used for heat exchange serve as a high-temperature steam and maintains the exhaust air at or above a fixed, high temperature, so as to enable energy to be extracted more efficiently.

The power generation system 10 is also provided with the exhaust fuel heat exchanger 92 so as to enable heat to be recovered from the exhaust fuel gas and to enable the load on the exhaust fuel gas circulation line to be reduced like the exhaust air heat exchanger 91. The exhaust fuel heat exchanger 92 also makes the steam to be used for heat exchange serve as the steam superheated by the intermediate-pressure superheater 72SH of the intermediate-pressure steam circulation mechanism 72, so as to enable the exhaust fuel gas to be maintained at or above a fixed, high temperature. Accordingly, the power generation system 10 performs heat exchange between the exhaust fuel gas and the steam so as to enable the load on the exhaust fuel gas circulation line circulating the exhaust fuel gas to be reduced, and, in addition, makes the steam to be used for heat exchange serve as a high-temperature steam and maintains the exhaust air at or above a fixed, high temperature so as to enable energy to be extracted more efficiently.

The power generation system 10 is also provided with the fuel heat exchanger 94 and the fuel heat exchanger 96 to raise the temperature of the fuel gas, so as to enable the heat to be extracted as energy for power generation in two places including the gas turbine 11 and the steam turbine 14. Accordingly, this enables more efficient energy extraction.

Here, the power generation system 10 may include a path other than the path of the steam flowing into the heat exchange unit. Note that the exhaust air heat exchanger may use the steam that has undergone heat exchange with the exhaust gas in the high-pressure steam circulation mechanism or the intermediate-pressure steam circulation mechanism and flowing toward the turbine.

Figure 4:
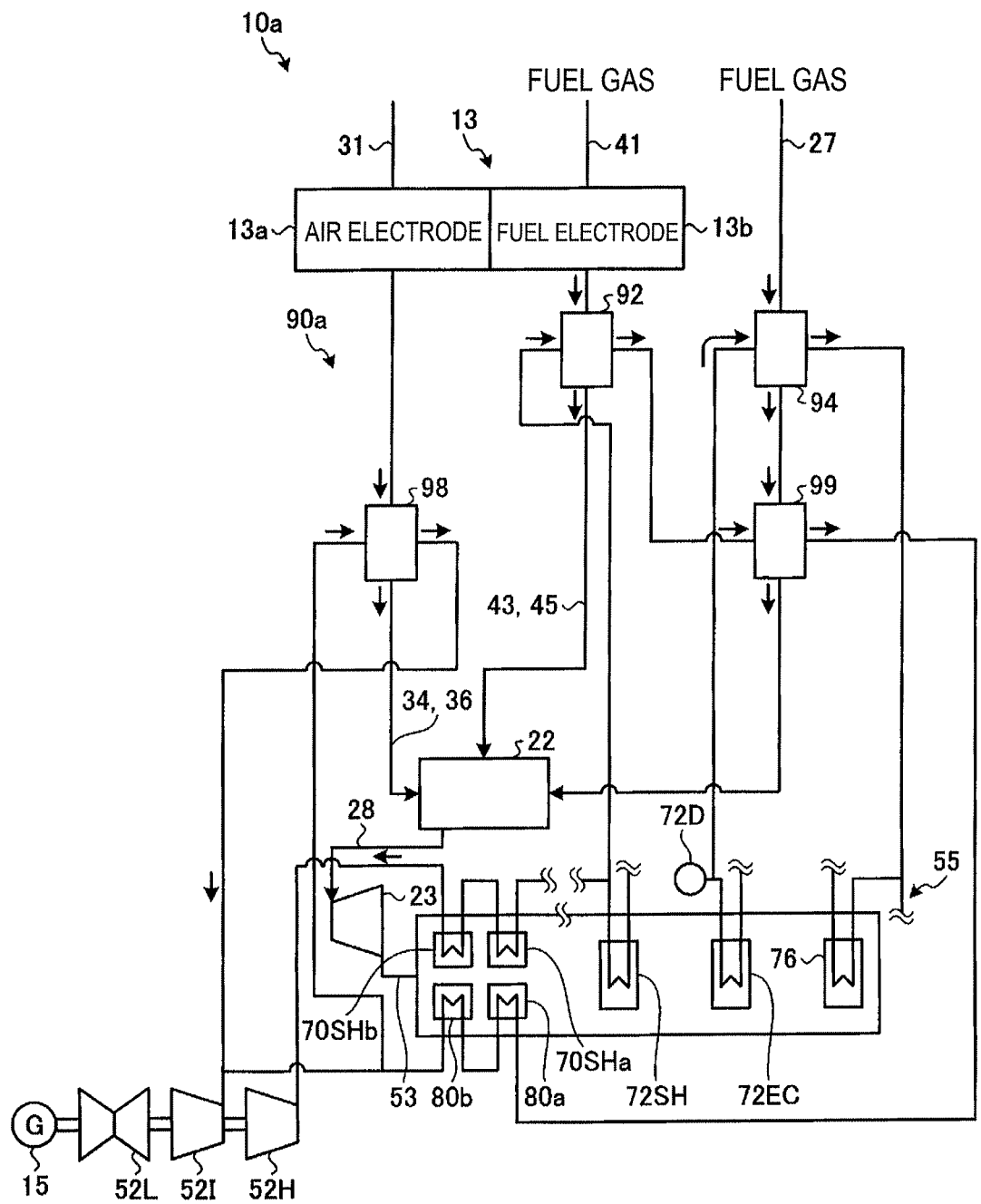
FIG. 4 is a schematic configuration diagram illustrating another example of the heat exchange unit of the power generation system of the embodiment.

FIG. 4 is a schematic configuration diagram illustrating another example of the heat exchange unit of the power generation system of the embodiment. As illustrated in FIG. 4, the power generation system 10a is provided with a heat exchange unit 90a performing heat exchange between the exhaust air and exhaust fuel gas directed from the SOFC 13 toward the gas turbine 11, and the steam flowing through the heat recovery steam generator 51 and the turbine 52. The heat exchange unit 90*a* includes an exhaust air heat exchanger 98, the exhaust fuel heat exchanger 92, the fuel heat exchanger 94, and a fuel heat exchanger 99.

The exhaust air heat exchanger 98 is provided in the exhaust air circulation line. The exhaust air heat exchanger 98 performs heat exchange between the exhaust air flowing through the exhaust air circulation line and the steam superheated by the heat recovery steam generator 51 and directed toward the turbine 52, so as to lower the temperature of the exhaust air and to raise the temperature of the steam. The exhaust air heat exchanger 98 has flow into it steam which has been superheated by the reheater 80*b*, and supplies this steam that has undergone heat exchange to the intermediate-pressure turbine 52I. Note that in the embodiment, steam superheated by the reheater 80*b* flows into the exhaust air heat exchanger 98; however, steam superheated by the reheater 80*a* may be used instead. The exhaust air heat exchanger 98 which serves to lower the temperature of the steam passing therethrough to a temperature adequate for supply to the intermediate-pressure turbine 52I may have flow into it the steam which is to be supplied to the intermediate-pressure turbine 52I and has been superheated by the intermediate-pressure superheater 72SH like the steam superheated by the reheater 80*b*.

The exhaust fuel heat exchanger 92 is provided in the exhaust fuel gas circulation line. The exhaust fuel heat exchanger 92 performs heat exchange between the exhaust fuel gas flowing through the exhaust fuel gas circulation line and the steam superheated by the heat recovery steam generator 51 and directed toward the turbine 52, so as to lower the temperature of the exhaust fuel gas and to raise the temperature of the steam. The exhaust fuel heat exchanger 92 has flow into it steam which has been superheated by the intermediate-pressure superheater 72SH, and supplies this steam that has undergone heat exchange to the fuel heat exchanger 99. The steam supplied to the fuel heat exchanger 99 is then supplied to the reheater 80*a*. The steam supplied to the reheater 80*a* is further superheated by the reheater 80*b* and then supplied to the intermediate-pressure turbine 52I.

The fuel heat exchanger 94 is configured similarly to the fuel heat exchanger 94 of the heat exchnage unit 90.

The fuel heat exchanger 99 is provided further on the downstream side of the first fuel gas supply line 27 in the flow direction of the fuel gas, relative to the fuel heat exchanger 94, that is, the fuel heat exchanger 99 is provided closer to the combustor 22. The fuel heat exchanger 99 performs heat exchange between the fuel gas flowing through the first fuel gas supply line 27, that is the fuel gas supplied to the combustor 22, and the steam that has passed through the exhaust fuel heat exchanger 92. The fuel heat exchanger 99 raises the temperature of the fuel gas and lowers the temperature of the steam. The fuel heat exchanger 99 further raises the temperature of the fuel that has been raised by the fuel heat exchanger 94. The fuel heat exchanger 99 has flow into it steam that has passed through the exhaust fuel heat exchanger 92, and supplies the flowed steam with temperature lowered through heat exchange to the reheater 80*a*. The heat exchange unit 90*a* is configured as described above.

The power generation system 10*a* is provided with the exhaust air heat exchanger 98, and performs heat exchange between the exhaust air and the steam superheated by the reheat steam circulation mechanism 79 after being superheated by the high-pressure steam circulation mechanism 70 and supplied to the high-pressure turbine 52H, so as to lower the temperature of the exhaust air. This also enables the load on the exhaust air circulation line circulating the exhaust air to be reduced. Further, having steam superheated in the reheat steam circulation mechanism 79 undergo heat exchange with the exhaust air enables the temperature of the exhaust air to be maintained at or above a high fixed, temperature. Accordingly, the power generation system 10*a* performs heat exchange between the exhaust air and the steam, so as to enable the load on the exhaust air circulation line circulating the exhaust air to be reduced and, in addition, makes the steam to be used for heat exchange serve as a high temperature steam and maintains the exhaust air at or above a fixed, high temperature, so as to enable energy to be extracted more efficiently.

The power generation system 10*a* also performs heat exchange between the steam superheated by the high-pressure steam circulation mechanism 70 and directed toward the high-pressure turbine 52H, and the exhaust air and the steam superheated by the reheat steam circulation mechanism 79 and directed toward the intermediate-pressure turbine 52I, so as to enable the temperature of the exhaust air to be lowered to a more appropriate temperature range; thus it is preferable, but, as described above, the steam superheated by the intermediate-pressure steam circulation mechanism 72 and directed toward the intermediate-pressure turbine 52I may be used. Note that it is preferable that the steam serve as steam superheated by at least one stage superheater or reheater.

Figure 5:
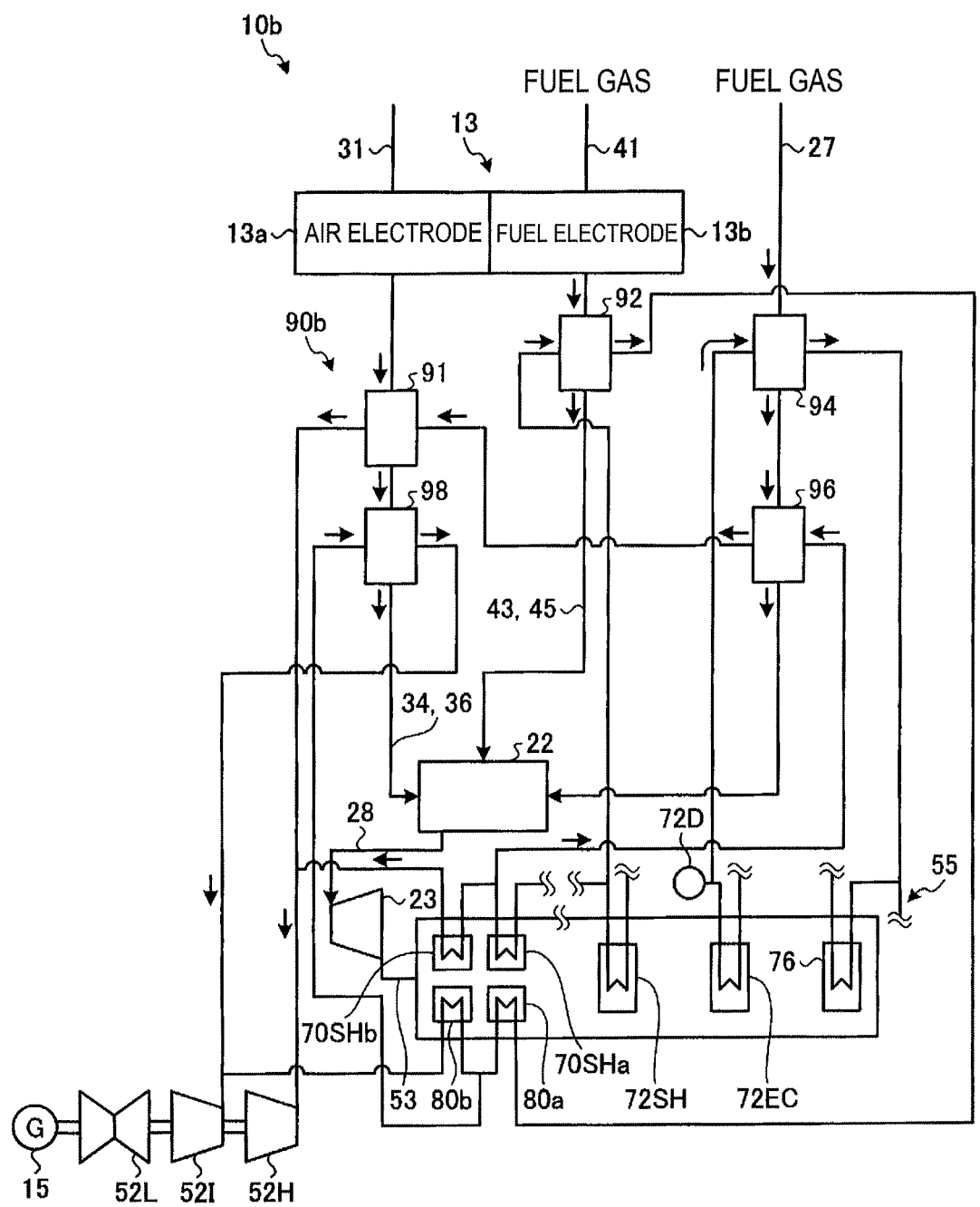
FIG. 5 is a schematic configuration diagram illustrating another example of the heat exchange unit of the power generation system of the embodiment.

Next, FIG. 5 is a schematic configuration diagram illustrating another example of the heat exchange unit of the power generation system of the embodiment. As illustrated in FIG. 5, the power generation system 10*b* is provided with a heat exchange unit 90*b* performing heat exchange between the exhaust air and exhaust fuel gas directed from the SOFC 13 toward the gas turbine 11, and the steam flowing through the heat recovery steam generator 51 and the turbine 52. The heat exchange unit 90*b* is provided with the exhaust air heat exchanger 91, the exhaust air heat exchanger 98, the exhaust fuel heat exchanger 92, the fuel heat exchanger 94, and the fuel heat exchanger 96. That is, the power generation system 10*b* is constituted of the power generation system 10 with the addition of the exhaust air heat exchanger 98. Note that into the exhaust air heat exchanger 98 flows steam that has been superheated by the reheater 80*a*.

The power generation system 10*b* uses both the exhaust air heat exchanger 91 and the exhaust air heat exchanger 98, so as to enable the temperature of the exhaust air to be lowered with the both heat exchangers. Such a heat exchanger is not limited to one stage and may also be provided in plurality.

REFERENCE SIGNS LIST

10, 10*a*, 10*b* Power generation system
11 Gas turbine
12 Power generator
13 Solid Oxide Fuel Cell (SOFC)
14 Steam turbine
15 Power generator
21 Compressor
22 Combustor
23 Turbine
25 Air intake line
26 First compressed air supply line
27 First fuel gas supply line
31 Second compressed air supply line 32 Control valve
33, 48 Blower
34 Exhaust air line
36 Compressed air circulation line
41 Second fuel gas supply line
42 Control valve
43 Exhaust fuel line
44 Waste line
45 Exhaust fuel gas supply line
47 Control valve
49 Fuel gas recirculation line
50 Recirculation blower
51 Heat recovery steam generator
52 Turbine
52H High-pressure turbine
52I Intermediate-pressure turbine
52L Low-pressure turbine
53 Exhaust gas line
54 Steam supply line
55 Water supply line
56 Condenser
57 Water supply pump
62 Control device
70 High-pressure steam circulation mechanism
70D High-pressure drum
70EC High-pressure economizer
70EV High-pressure steam evaporator
70SHa, 70SHb High-pressure superheater
72 Intermediate-pressure steam circulation mechanism
72D Intermediate-pressure drum
72EC Intermediate-pressure economizer
72EV Intermediate-pressure steam evaporator
72SH Intermediate-pressure superheater
74 Low-pressure steam circulation mechanism
74D Low-pressure drum
74EC Low-pressure economizer
74EV Low-pressure steam evaporator
74SH Low-pressure superheater
76 Pre-heater
78H High-pressure pump
78I Intermediate-pressure pump
78L Low-pressure pump
79 Reheat steam circulation mechanism
80a, 80b Reheater
90 Heat exchange unit
91, 98 Exhaust air heat exchanger
92 Exhaust fuel heat exchanger
94, 96, 99 Fuel heat exchanger

The invention claimed is:

1. A power generation system comprising:
a gas turbine having a compressor and a combustor;
a fuel cell having an air electrode and a fuel electrode;
a line which connects the fuel cell and the combustor, and supplies a medium from the fuel cell to the combustor;
a heat recovery steam generator which generates heat recovery steam generator steam with heat recovered from flue gas discharged from the gas turbine and supplies the heat recovery steam generator steam to a steam turbine; and
a heat exchanger which is disposed on the line and elevates a temperature of the heat recovery steam generator steam by exchanging heat between the medium supplied to the combustor from the fuel cell and the heat recovery steam generator steam supplied to the steam turbine from the heat recovery steam generator,
wherein the line includes an exhaust air circulation line connecting between the air electrode and the combustor to supply an exhaust air from the air electrode to the combustor, and an exhaust fuel gas circulation line connecting the fuel electrode and the combustor to supply an exhaust fuel gas from the fuel electrode to the combustor,
wherein the heat exchanger includes an exhaust air heat exchanger disposed on the exhaust air circulation line to perform heat exchange between the exhaust air and a high-pressure superheater steam supplied from a high-pressure superheater of the heat recovery steam generator, and an exhaust fuel heat exchanger disposed on the exhaust fuel gas circulation line to perform heat exchange between the exhaust fuel gas and an intermediate-pressure superheater steam supplied from an intermediate-pressure superheater of the heat recovery steam generator.

2. A method for operating a power generation system according to claim 1,
the method comprising the steps of:
elevating a temperature of the heat recovery steam generator steam by exchanging heat between the medium supplied to the combustor from the fuel cell and the heat recovery steam generator steam supplied to the steam turbine from the heat recovery steam generator.

3. The method for operating the power generation system according to claim 2, wherein:
the method further comprises the step of:
cooling the heat recover steam generator steam by exchanging heat between the heat recovery steam generator steam and the fuel gas at the fuel gas heat exchanger; and
heating the steam heat recovery steam generator by exchanging heat between the heat recovery steam generator steam after cooled by the fuel gas and the exhaust air supplied from the fuel cell to the combustor at the exhaust air heat exchanger.

4. The method for operating the power generation system according to claim 2, wherein
the method further comprises the steps of:
heating the heat recovery steam generator steam by exchanging heat between the heat recovery steam generator steam and the exhaust fuel at the fuel heat exchanger; and
cooling the heat recovery steam generator steam by exchanging heat between the heat recovery steam generator steam after heated by the exhaust fuel gas and the fuel gas at the fuel gas heat exchanger.

* * * * *